(12) United States Patent
Reimnitz et al.

(10) Patent No.: US 12,424,914 B2
(45) Date of Patent: Sep. 23, 2025

(54) ELECTRICAL MACHINE ARRANGEMENT

(71) Applicant: Schaeffler Technologies AG & Co. KG, Herzogenaurach (DE)

(72) Inventors: Dirk Reimnitz, Buhl (DE); Ivo Agner, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 86 days.

(21) Appl. No.: 18/033,497

(22) PCT Filed: Oct. 26, 2021

(86) PCT No.: PCT/DE2021/100855
§ 371 (c)(1),
(2) Date: Apr. 24, 2023

(87) PCT Pub. No.: WO2022/089686
PCT Pub. Date: May 5, 2022

(65) Prior Publication Data
US 2024/0022149 A1   Jan. 18, 2024

(30) Foreign Application Priority Data
Oct. 26, 2020   (DE) .................. 102020128140.4

(51) Int. Cl.
*H02K 7/08* (2006.01)
*H02K 15/16* (2006.01)

(52) U.S. Cl.
CPC .............. *H02K 15/16* (2013.01); *H02K 7/08* (2013.01); *H02K 2201/03* (2013.01); *H02K 2201/15* (2013.01)

(58) Field of Classification Search
CPC ........ H02K 15/16; H02K 7/00; H02K 5/1732; H02K 21/026; H02K 7/083
See application file for complete search history.

(56) References Cited

U.S. PATENT DOCUMENTS

| | | | |
|---|---|---|---|
| 6,448,674 B1 * | 9/2002 | Schierling | F16F 15/13157 310/91 |
| 6,922,004 B2 * | 7/2005 | Hashimoto | H02K 7/116 310/268 |
| 9,496,776 B2 * | 11/2016 | Woolmer | H02K 5/203 |

FOREIGN PATENT DOCUMENTS

| | | | |
|---|---|---|---|
| DE | 102020122255 A1 | 3/2022 | |
| FR | 3002191 A3 * | 8/2014 | ............ B60K 6/26 |
| WO | WO-2013167670 A2 * | 11/2013 | ........... H02K 1/2793 |

OTHER PUBLICATIONS

FR-3002191-A3 machine translated, Jan. 11, 2025.*
WO-2013167670-A2 machine translated, Jan. 11, 2025.*

* cited by examiner

*Primary Examiner* — Leda T Pham
(74) *Attorney, Agent, or Firm* — Volpe Koenig

(57) ABSTRACT

An electrical machine arrangement including an electrical axial flux machine having a stator and having a rotor, a component supporting the stator, and a rotor shaft which is in contact with the rotor so as to rotate therewith. The rotor is arranged inside the electrical machine arrangement in a manner rotatably mounted by means of at least one bearing point. The stator has at least one stator half which is axially spaced apart from the rotor by an air gap. At least one spacer element is provided for axially orienting at least two of the assemblies: first stator half, second stator half (and rotor relative to one another.

6 Claims, 6 Drawing Sheets

ELECTRICAL MACHINE ARRANGEMENT

CROSS-REFERENCE TO RELATED APPLICATIONS

This application is the U.S. National Phase of PCT Appln. No. PCT/DE2021/100855, filed Oct. 26, 2021, which claims benefit of German Patent Appln. No. 102020128140.4 filed Oct. 26, 2020, the entire disclosures of which are incorporated by reference herein.

TECHNICAL FIELD

The present disclosure relates to an electrical machine arrangement, comprising an electrical axial flux machine having a stator and having a rotor, and a rotor shaft which is in contact with the rotor so as to rotate therewith, wherein the rotor is arranged to be rotatably mounted in electrical machine arrangement by means of at least one bearing point. Furthermore, the present disclosure also includes an assembly method for axially orienting assemblies of an electrical machine arrangement relative to one another.

BACKGROUND

In electric motors, the position of the parts through which the magnetic field flows is very important. This applies both to the mechanical structure of the electric motor, through which the parts are positioned in relation to one another, and to precise knowledge of the angular position of the rotating parts, by means of which the exact current position of the rotor relative to the stator is detected. An exact, rigid mechanical structure is important, since even small position deviations for the parts among one another can have a significant effect on the magnetic flux (e.g., due to altered air gaps). It is therefore important to make the mechanical structure of the electric motor sufficiently precise to ensure the necessary exact orientation of the electric or magnetic parts. Dimensional deviations in the components of the electric motor through which the magnetic field flows, regardless of whether they form deviations or positional deviations, impair the efficiency, the service life, and/or the performance of the electric motor. This applies in particular to the special type of axial flow machine as a particular embodiment of an electric motor.

SUMMARY

An object of the present disclosure is to provide a machine arrangement having an electrical axial flow machine in which the negative effect of component tolerances can be reduced and a sufficiently precise orientation of the motor components can be ensured. A suitable assembly method for such an electrical machine arrangement is also to be found.

The object is achieved by an electrical machine arrangement having the features set forth in the present disclosure. The present disclosure also set forth an assembly method.

In the practical design of electric motors for motor vehicles, the need to manufacture the components of the electric motor particularly precisely often contradicts the requirements that always exist in vehicle construction for large-scale production processes, tolerance insensitivity and low costs.

According to the disclosure, the stator has at least a first and a second stator half, which are axially spaced apart from the rotor on respectively different axial sides. In this way, an air gap is formed between the rotor and the corresponding stator half on both axial sides of the rotor.

According to the disclosure, at least one spacer element is provided for axially orientating at least two of the assemblies: first stator half, second stator half, and rotor relative to one another. An axial flow machine has, among other things, the rotor and a stator as assemblies. One possible factor affecting motor efficiency is the accuracy with which the air gap between the rotor and stator is adjusted. Since the air gap of the axial flow machine is defined by the axial positioning of the rotor and one stator half relative to one another, the air gap can be easily adjusted as required by this spacer element. In this way, damage caused by an air gap that is too small can be avoided. On the other hand, the efficiency of the motor is increased if care is taken that the air gap does not become too large.

Axial flow machines with a plurality of partial rotors are also conceivable, each of which is axially enclosed by partial stators. A partial rotor can in turn be connected to such a partial stator. For example, all partial rotors can then be arranged on the same rotor shaft. With such an arrangement, air gaps are then present between each partial rotor and the axially adjoining partial stators. All air gaps can then be adjusted by spacer elements in such a way that the axial flux machine functions as desired, i.e., the operating point can be adjusted and optimized according to predetermined framework conditions such as efficiency and durability.

As a result, the tolerances can be reduced in a particularly simple manner while at the same time having low costs and a manufacturing process that can still be realized.

Further advantageous embodiments of the disclosure are specified in the dependent claims.

Electrical machines are used to convert electrical energy into mechanical energy and/or vice versa, and generally include a stationary part referred to as a stator, stand, or armature, and a part referred to as a rotor or runner, and arranged to be movable relative to the stationary part.

In the case of electrical machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The electrical machine is enclosed in a housing. The housing can also accommodate the control and power electronics. The housing can furthermore be part of a cooling system for the electrical machine, and can be designed in such a way that cooling fluid can be supplied to the electrical machine via the housing and/or the heat can be dissipated to the outside via the housing surfaces. In addition, the housing protects the electrical machine and any electronics that might be present from external influences.

A rotor is the rotating (spinning) part of an electrical machine. In particular, a rotor is used when there is also a stator. The rotor generally comprises a rotor shaft and one or more rotor bodies or partial rotors arranged on the rotor shaft for conjoint rotation. The rotor shaft can also be hollow, which on the one hand saves weight and on the other hand allows lubricant or coolant to be supplied to the rotor body. If the rotor shaft is hollow, components, for example shafts, from adjacent units can protrude into the rotor or through the rotor without negatively influencing the functioning of the electrical machine. The rotor shaft itself can also consist of several partial rotor shafts.

Whenever an axial direction or an axial spacing is mentioned, reference is always made to the axis of rotation of the motor, i.e., to the axis of rotation of the rotor. The same applies to the use of the terms radial or tangential, or circumferential, or the like.

Like the stator, the rotor comprises windings and/or permanent magnets. In an axial flow machine, the rotor and stator each have end faces that each axially delimit a closed region. The stator surface or rotor surface can in particular be designed in the shape of a cover and thus directly form an end face of the rotor or stator or a stator half. However, it can also be the case that these are surfaces that only serve to illustrate the axial end regions of the stator and rotor, or the stator halves.

The gap between the rotor and the stator is called the air gap. It is the gap between an end face of the rotor and the end face of a stator. This also applies if neither the stator nor the rotor is closed off or encapsulated by a cover, but magnets/electromagnets are present open and without a cover.

In an electrical axial flux machine, the magnetic flux is oriented to be parallel to the axis of rotation of the electrical machine. The air gap that is formed in an axial flux machine is thus essentially formed in the shape of an annular disc around the axis of rotation.

With axial flux machines, a differentiation is made, among other things in terms of design, between axial flux machines in an I-arrangement and axial flux machines in an H-arrangement. An axial flux machine in an I-arrangement is understood as meaning an electrical machine in which a single rotor disc of the electrical machine is arranged between two stator halves of a stator of the electrical machine and can be acted upon by a rotating electromagnetic field. An axial flux machine in an H-arrangement is understood to be an electrical machine in which two rotor discs of a rotor of the electrical machine accommodate a stator of the electrical machine in the annular space located axially therebetween, via which the two rotor discs can be subjected to a rotating electromagnetic field. The two rotor discs of an electrical machine in an H-arrangement are mechanically connected to one another. This usually takes place via a (rotor) shaft or a shaft-like connecting element, which protrudes radially inward (radially inside the magnets of the electrical machine) through the stator and connects the two rotor discs radially inwardly to one another. A special form of the H-arrangement is represented by electrical machines, the two rotor discs of which are connected to one another radially on the outside (radially outside of the magnets of the electrical machine). The stator of this electrical machine is then fastened radially on the inside (usually on one side) to a component that supports the electrical machine. This special form of the H-arrangement is also known as the J-arrangement.

According to an advantageous embodiment of the disclosure, it can be provided that a bearing is formed between the stator and the rotor. The advantage of this configuration lies in the fact that the machine arrangement or the components of the machine arrangement have an improved tipping stability with respect to one another.

It is provided here that at least the first stator half or the second stator half is mounted on the rotor shaft by means of a bearing point. The axial orientation of the first or second stator half to the rotor or to the respective end faces of the rotor can then be fixed by means of the at least one spacer element.

The bearing point can in particular be a bearing with a bearing inner ring and a bearing outer ring.

According to a further preferred development of the disclosure, it can also be provided that the bearing has a first bearing point, and a second bearing point spaced axially from the first bearing point. In this way, an improvement in the tipping stability can be achieved. In particular, both stator halves are then mounted on the rotor shaft by means of the two bearing points. In this way, the axial orientation of at least one of the stator halves can be fixed by means of at least one spacer element.

The spacer element can therefore be provided at any position lying in an axial chain between one of the stator halves and the rotor. It is also possible for several spacer elements to be provided either at one position one behind the other or also at various positions within the axial chain. In this way, the positioning of the stator halves and the rotor can take place as precisely as possible relative to one another and can also be implemented easily.

According to a further particularly preferred embodiment, it can be provided that the rotor is mounted by means of at least one bearing by means of at least one first bearing point in relation to the component supporting the stator. By supporting the rotor on a component that supports the stator and not directly connecting it to the stator by means of a bearing point, the mechanical stresses on the structure of the stator are reduced. This enables a more cost-effective design of the stator or enables the stator design to be optimized even more with regard to the magnetic properties of the electrical machine and to optimize the efficiency thereof.

In a further embodiment it can be provided that the spacer element is arranged axially between the at least one bearing point and the rotor or axially between the at least one bearing point and one of the two stator halves. A holder for the spacer element can also be provided at these points in a simple manner. In particular, a plurality of spacer elements can also be provided at various of these positions.

In these embodiments, it can be provided that the spacer element is an adjustment disc which is arranged on an axial end face of a bearing inner ring or bearing outer ring of one of the bearing points.

In general, in addition a plurality of spacer elements, in particular, adjustment discs can also be provided in the electrical machine arrangement. To adjust an axial position or to axially orient the stator halves and the rotor relative to one another, a suitable number of spacer elements of the same thickness or of spacer elements with different thicknesses can then be selected from this plurality of spacer elements.

Alternatively or additionally, it can also be provided that the spacer element is a radial region of another component, such as a sleeve. In particular, sleeves with radial regions of various widths can be provided, so that a suitable sleeve can be selected. In this case, the sleeve has, for example, an axially running section which, for example, radially overlaps a bearing outer ring, and an adjoining radial region with a predetermined axial extent/width. The radial region runs in the radial direction and is then located axially between corresponding surfaces, for example the stator and a bearing outer ring or the rotor and a bearing inner ring, or rotor carrier and bearing inner ring.

Provision can furthermore be made for the first stator half to be oriented axially relative to the second stator half by means of a spacer element. The spacer element is thus arranged axially between these two stator halves, so that end faces of both stator halves abut axially on the spacer element. In particular, it can also be provided that this spacer element is arranged radially outside of the rotor and preferably axially nested therewith in the installed state. If the spacer element is arranged radially outside of the rotor, non-axially nested positions are also possible. In this way, a simple, final positioning of the two stator halves relative to one another, or an integral connection of the stator halves to one another, is achieved in an assembly process. An adjustment disc, an adjustment ring, a radial sleeve section of a sleeve or a spacer sleeve can be considered here as the spacer element. In particular, a spacer element that can be variably tuned to the actual distance between the two stator halves can also be provided.

Furthermore, an object of the disclosure is achieved by an assembly method for axially orienting assemblies relative to one another in an electrical machine arrangement as described above.

First, two end faces of two assemblies are selected, so that a total of four end faces are selected. The actual distances between these end faces are determined for every two of these end faces that are assigned to the same assembly. These actual distances are then compared with stored, i.e., predetermined, target distances, so that a deviation of the actual distance from the target distance is determined for each pair of end faces measured. A deviation is thus determined for each of the two assemblies. On the basis of the two deviations determined in this way, at least one spacer element with a thickness predetermined by the target/actual comparison is then selected and used to orient the two assemblies relative to one another.

A plurality of spacer elements with various thicknesses can be stored. Several spacer elements can then also be used to orient the two assemblies, which then achieve the necessary overall thickness. These several spacer elements can have the same or different thicknesses.

The assemblies can be: a first stator half, a second stator half, or a rotor of the electrical machine arrangement. In this way, two of the assemblies can be oriented relative to one another. In this way, the first half of the stator can first be oriented with the rotor. The second stator half can then be oriented with this assembly of rotor and first stator half, so that the air gaps on both axial sides of the rotor can be adjusted relative to the respective stator halves.

In a final step, the stator halves can then also be oriented relative to one another, wherein the connection to the rotor must not be abandoned.

Various surfaces of the assemblies are available as end faces to be selected, wherein these surfaces are all intended to be essentially parallel to one another, at least in pairs, so that an axial deviation can be determined. In particular, the end faces should be selected in such a way that all end faces are oriented to be essentially parallel to one another in the installed state. In this way, the deviations form a cumulative chain in the axial direction, which can be compensated for relative to one another at one or more positions in the assembly of the assemblies. The end faces can be surfaces on various elements that can be assigned to the individual assemblies. In particular, it can be an end face of an element from the group consisting of bearing point, bearing inner ring, bearing outer ring, rotor shaft, stator ring, rotor magnets, rotor magnet cover, stator magnets, and stator magnet cover.

Various surfaces such as housing parts, end parts, an end plane of magnets or shoulders on shafts or rings, or directly the axial end face of a bearing inner or outer ring come into consideration as end faces.

To at least reduce the deviations of two components that are to be oriented axially relative to one another in a simple manner, a further development provides for the spacer element to be inserted between two axially adjacent end faces of the two assemblies. In this way, an air gap in particular can be adjusted between the assemblies.

The thickness of the spacer element can be suitable to reduce the total deviations to zero if it is arranged in a suitable place.

This can in particular be understood to mean that only one spacer element is used, which eliminates the differences between the two assemblies.

To be able to eliminate deviations of any sign here, it can be provided that the desired distance is selected such that a spacer element of medium thickness must be used here to enable a desired orientation of the two assemblies with respect to one another. In particular, this means that a spacer element is used even if the actual distances do not deviate from the target distances. A maximum deviation that can still be corrected is then characterized on the one hand by the fact that no spacer element is used to achieve the desired orientation. In this way, deviations from the target distance can also be corrected in both directions.

An exemplary assembly procedure is described below:

To adjust the air gaps on both sides of a rotor, two end faces can first be selected on a first axial side of the rotor. One of these end faces should advantageously directly specify the axial position of the rotor magnets of the rotor, since the air gap should finally be adjusted between the rotor magnets and the stator magnets.

A first end face of the rotor can be the first axial end face of the rotor magnets. A surface is then selected as the second end face which directly specifies the axial position of a contact surface with the first stator half in the assembly. For this purpose, for example, a shoulder of the rotor shaft can be selected, against which the first stator half is placed in assembly. Care is taken to ensure that the end faces measured are oriented to be essentially parallel to one another.

The distance between the two end faces of the rotor can then be measured with a suitable tool. This actual distance can then be measured with a predetermined target distance and a deviation can be determined. This can also be understood to mean that two measurements are made from a suitable measurement reference using a tool and the difference between the measured values is then formed.

A deviation can also be determined for two end faces of the first stator half in the same way. The end face should initially be chosen to be an end face that directly determines an axial position of the stator magnets. This can preferably be the end face of the stator magnet itself or the magnet cover thereof. The second end face should then also determine the axial position of the interface between the first stator half and the rotor. If the first stator half is mounted on the rotor shaft by means of a bearing point, the end face of the bearing ring, which is placed against the shoulder of the rotor shaft during assembly, is preferably suitable for this purpose. This is preferably the side of the bearing inner ring that faces the rotor. The actual axial distance from the end face of the stator magnet to the end face of the bearing inner ring is then measured. Analogously, a deviation of this actual distance from the target distance is then determined.

The corresponding actual distances on the axially other, second side of the rotor, which faces the second stator half, are determined in an analogous manner.

The bearing point can be assigned either to the rotor assembly or to the first or second stator half assembly. Depending on the assignment, one of the actual distances can then be determined via an end face of the bearing outer ring to the end face of the rotor magnets, an end face of the bearing inner ring to the end face of the rotor magnets, an end face of the bearing outer ring to the end face of the stator magnets, or as described, via an end face of the bearing inner ring to the end face of the stator magnets.

A deviation of the actual distances from the desired distances on the first and the second axial side of the rotor is determined. Depending on the deviation determined, it is determined for each side what thickness a spacer element must have in each case to reduce the deviation or, if possible, to eliminate it.

Since tolerances in the axial positions of the end faces occur in both directions, both positive and negative deviations can result for all assemblies, i.e., the rotor and the two stator halves.

A system is therefore proposed which comprises a set of spacer elements and assemblies as described above, which is suitable for carrying out the assembly method described. This set of spacer elements includes spacer elements of various thicknesses or widths, i.e., axial widths, so that the widest possible range of deviations can be compensated for. It can be provided that the target distance is normalized in such a way that a lower extreme, an upper extreme of deviations, and a zero deviation of the actual deviation from the target deviation are defined, in which region deviations can be compensated by the set of spacer elements. The maximum deviation, i.e., the upper extreme, is compensated for by a spacer element with the maximum predetermined width, the zero deviation by a spacer element with half the maximum width, and the minimum deviation, i.e., the lower extreme, is compensated for by omitting a drain element. The width of the spacer element, i.e., the axial extent, is not only determined by the amount of the deviation, but also by the sign thereof. A negative sign means a width that is less than the width of the spacer element for the zero deviation. A positive sign, on the other hand, always results in a wider spacer element. The remaining spacer elements then move with regard to the width thereof or thickness in the range between no spacer element and a spacer element of the maximum range. This distribution is possible when the deviations from the target value are static and random. If the tolerances are shifted in one direction, a non-symmetrical thickness or width distribution of the spacer elements around the zero deviation can also be provided.

To compensate for the determined deviation on one side or the other of the rotor, a spacer element is provided axially between a bearing inner ring and a shoulder of the rotor shaft. Alternatively or additionally, spacer elements can also be provided axially between a bearing outer ring and a stator carrier, which can also be designed as a stator flange. In particular, a spacer element of medium thickness is provided when the actual distance just corresponds to the desired distance, i.e., with a zero deviation.

Alternatively, the necessary thickness of the spacer elements can also be achieved by using a plurality of spacer elements, in particular at different points. It is possible to have the spacer elements in a "series connection", so to speak. For example, to choose either to shim both the rotor and the stator to "0" or to the right overall thickness with several spacer elements.

In this way, the two stator halves are oriented with respect to the rotor in such a way that air gaps of a desired width result between the rotor magnets and the stator magnets.

Finally, another spacer element is then provided in the axial region between the stator halves, so that an axial interface adjustment between the stator halves also occurs here. For this purpose, a deviation of the actual distances of the end face of a radially outer region of the stator halves from the end faces of the stator magnets is determined. Alternatively, a deviation from the end faces of a radially inner region of the stator ring or of a bearing outer ring or bearing inner ring of the stator ring can also be determined. In particular, the ACTUAL thickness of the rotor is also initially determined to then be taken into account when determining the correct adjustment thickness between the two stator halves.

In this way, both the stator halves are oriented with the rotor, i.e., the stator magnets are oriented with the rotor magnets, and the stator halves or the stator rings are oriented relative to one another.

Errors in parallelism or angular deviations can also be evaluated and reduced/corrected. To do this, measurements must be taken at a number of points distributed around the circumference, and spacer elements of various thicknesses, i.e., with various adjustment thicknesses, must be arranged to be distributed over the circumference. What is termed a "parallel connection" of the spacer elements can also be used for this purpose to realize various adjustment thicknesses at various points on the circumference to be able to reduce angle errors, parallelism errors, etc., for example. In this case, not (only) the thickness of the spacer elements changes, but (also) the number of them which are placed one on top of the other in one position.

To adjust the position of two subassemblies of the electrical machine arrangement exactly relative to one another, a number of adjustment elements can also be combined. A plurality of adjustment elements can be stacked one on top of the other, so that the adjustment dimension required is formed by the sum of the adjustment element thicknesses. Additionally or alternatively, a plurality of adjustment elements can also be distributed adjacent to one another on the contact surfaces of the subassemblies or arranged distributed on the circumference of the subassemblies. Arranging a plurality of adjustment elements of the same thickness or a plurality of adjustment element stacks of the same thickness in parallel increases the number of elements required, but at the same time also enables the use of smaller and/or more simply shaped adjustment elements. This also makes it easier to use structurally identical adjustment elements at various points in the electrical machine arrangement, even though the contact surfaces of the subassemblies look different at the respective connection point.

A drive train with an electrical machine arrangement and a motor vehicle with such a drive train are also proposed.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size ratios shown are only schematic in nature. Identical reference symbols indicate the same objects, so that explanations from other figures can also be used.

In the figures.

DETAILED DESCRIPTION

Figure 1:
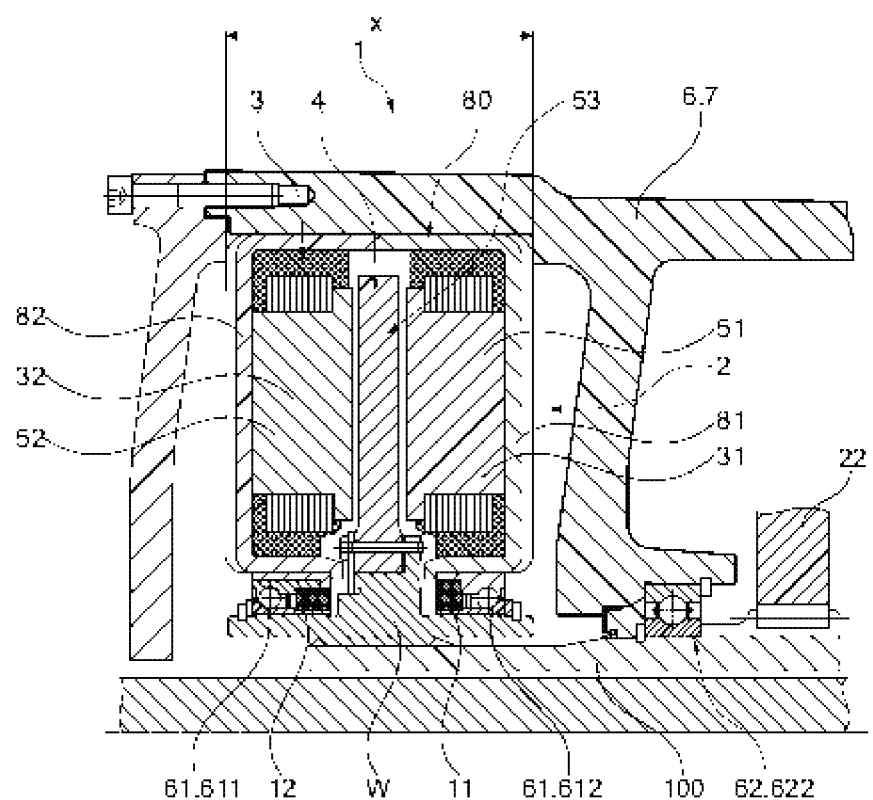
FIG. 1 shows an axial flux motor in an I arrangement to illustrate the technical environment, in an axial section in a schematic representation.

FIG. 1 shows an electrical machine arrangement 1 comprising an electrical axial flux machine 2 in an I-arrangement for driving an electrically drivable motor vehicle, a component 6 supporting the stator 3 in the form of a housing 7 and an output element 100 designed as an output shaft that is in contact with the rotor 4 so as to rotate therewith. The axial flux machine 2 has a stator 3 and a rotor 4. The rotor 4 is rotatably mounted in the electrical machine arrangement 1 by means of two bearing points 611, 612 axially spaced apart from one another. In addition, the output element 100 designed as an output shaft is supported by means of a further bearing point 622 in the side wall of a housing 7 of the axial flux machine 2. The bearing points 611, 612 support the rotor 4 both axially and radially by means of a rotor shaft W on the stator ring 80, or the two stator halves 31 and 32. The stator ring 80 is made up of a first stator ring 81 and a second stator ring 82. The two stator rings 81, 82 are coupled to one another radially outside of the rotor 4 and overlap it radially. The stator 3 is also made up of two stator halves 31, 32 to the left and right of the rotor 4. There are air gaps 41 both between the first stator magnet 51 and the rotor magnet 53 and between the second stator magnet 52 and the rotor magnet 53. The width of these air gaps 41 are responsible for the efficiency of the machine arrangement 1 and are necessary for the functionality thereof. They are dependent on the tolerances of the axial widths or thicknesses of the assemblies, first stator half 31, second stator half 32, and rotor 4, or the magnets 51, 52, 53 thereof, and the axial orientation thereof relative to one another.

It can clearly be seen that a shaft grounding element 11 and/or a rotor position sensor 12 is/are arranged in a space located between the rotor shaft W and the stator 3 in the radial direction and within the axial extent X of the stator 3 in the axial direction. The rotor shaft W is connected via an internal toothing to an external toothing of the output shaft 100, wherein the output shaft 100 meshes with the gear wheel of a transmission stage 22 outside the housing 7 via additional external toothing.

A bearing point 611 designed as a roller bearing with an integrated rotor position sensor 12 is shown on the left-hand side of the axial flux machine 2. The bearing inner ring 110 and the bearing outer ring 120 both have a connecting contour adjacent to the raceway for the roller bodies, to which the rotor position sensor 12 is attached. In FIG. 1, the region between the inner ring 110 and the outer ring 120, which is available for the rotor position sensor 12, is shown as a hatched cross-sectional region. Parts of the rotor position sensor 12 are connected to the bearing inner ring 110 and other parts of the rotor position sensor 12 are connected to the bearing outer ring 120. The rotor position sensor 12 detects the angular position of the sensor parts that are connected to the electromagnets of the stator 3 so as to rotate therewith via the bearing outer ring 120, relative to the parts of the rotor position sensor 12 that are connected to the permanent magnets of the rotor 4 so as to rotate therewith via the bearing inner ring. The angular position of the permanent magnets relative to the electromagnets can thus be continuously detected via the rotor position sensor 12. This information is necessary for the proper control of the electromagnets of the axial flux machine 2.

Figure 2:
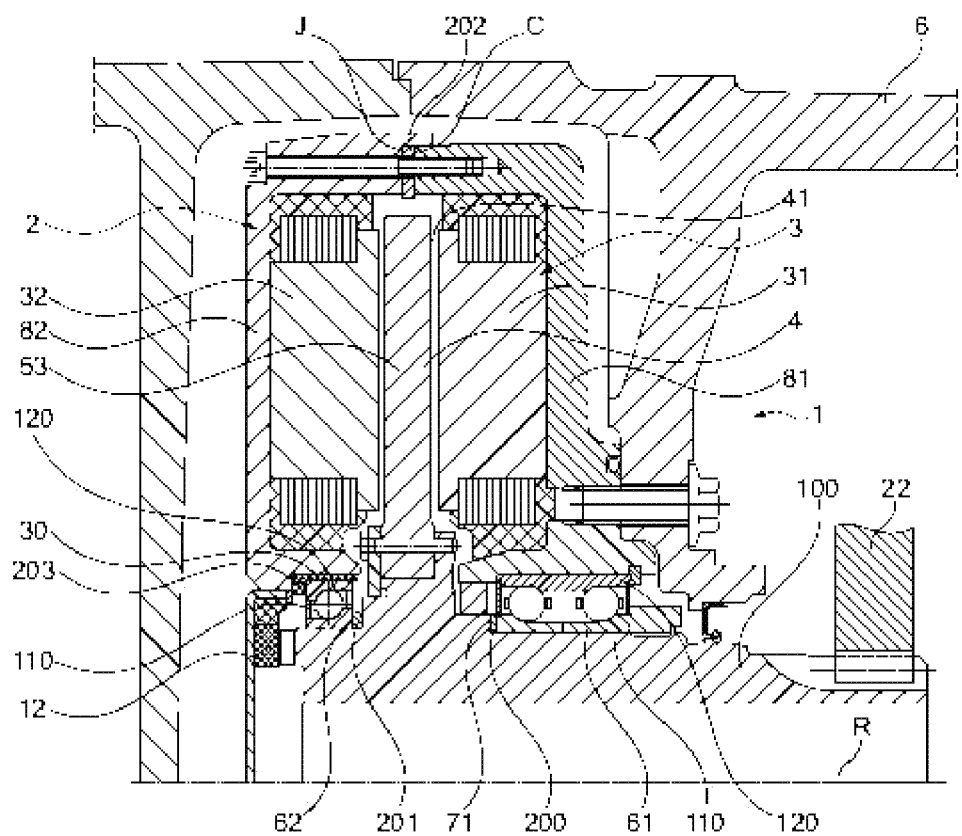
FIG. 2 shows a first machine arrangement having spacer elements.

FIG. 2 shows an electrical machine arrangement 1 having adjustment discs 200, 201, and 202 and a radial region 203 of a sleeve 30 as spacer elements. The sleeve 30 extends in the axial direction and has a radially extending radial region 203 with a predetermined axial thickness.

Here, the distance and the axial positioning of the stator halves 31 and 32 to the rotor 4 were first realized by means of adjustment discs 200, 201, 202 located axially on the inside. In this case, being located axially on the inside refers to the rotor 4. The axis here means the axis of rotation of the output shaft 100. This means that the adjustment discs 200, 201, 202 are located axially between the two stator rings 81 and 82.

FIG. 2 shows an axial flow machine 2 with adjustment discs 200, 201, 202 as spacer elements at several possible positions of the motor assembly. By choosing the right adjustment disc thickness, deviations in shape of the adjacent assemblies can be compensated for and the exact axial position of the assemblies adjacent to the adjustment discs 200, 201, 202 can be adjusted relative to one another. Even if it is possible to compensate for a detected deviation via a plurality of adjustment discs, it is usually intended to compensate for the deviations of two assemblies using an adjustment disc.

The precise function and a detailed component description of the axial flux motor shown in FIG. 1 will not be discussed further. In this regard, reference is made to the disclosure of the subsequently published DE 10 2020 122 255 A1, the disclosure of which should be included in relation to the structure of the axial flux motor.

The orientation process or the assembly process of the axial flux motor with regard to the air gap adjustment is described below:

The axial flow machine 2 shown in FIG. 2 consists of three main assemblies, each of which is pre-assembled separately and then subsequently connected to one another. The three assemblies consist of the two stator halves 31, 32 and the rotor 4. In an axial flow machine in an I or H arrangement 2, there are at least two radially running air gaps 41, each of which is located between an end face of the rotor 4 and an end face of a stator half 31, 32 of the stator 3, and through which the magnetic field flows (preferably axially). The axial distance between the respective rotor side and the associated stator side corresponds to the air gap width and has a significant influence on the properties of the axial flow machine 2. So that the axial flow machine 2 functions reliably and exhibits the intended properties thereof, the air gap widths can only deviate to a very small extent from the target values. If the air gaps 41 become too small, there is a risk that the rotor 4, which rotates at a speed relative to the stator 3, will come into contact with the latter and thus damage the rotor 4 and/or the stator 3. If the air gap 41 is too large, this represents too high a magnetic resistance so that the axial flow machine 2 can no longer deliver the maximum torque thereof. If the two air gaps 41 are of different widths, non-uniform forces act on the two sides of the rotor 4 and the stator 3, so that the motor structure is exposed to avoidable forces and vibration excitations. Since even very small deviations in the width of the air gap have a major influence on the axial flow machine 2, it makes sense to adjust them precisely.

When assembling the axial flow machine 2 shown in FIG. 2, it makes sense to start with one of the two stator halves 31, 32, then position the rotor 4 axially exactly with respect to this stator half 31, 32 and then assemble the second stator half 32, 31 by also axially orienting it exactly to the rotor 4. The axial distance between the two stator halves 31, 32 results from the two orientation processes by which each of the two stator halves 31, 32 is oriented with the rotor 4. Therefore, an axial length adjustment must also be possible at the connection point of the two stator halves 31, 32 to enable the exact orientation of the two stator halves 31, 32 to the rotor 4 and then to ensure a firm and permanent connection of the stator halves 31, 32.

In principle, it doesn't matter from which side of the engine one starts to orient and connect the main assemblies. The measurement, orientation, and assembly concept described here works from both sides. The following begins with the first stator half 31 on the output side of the axial flow machine 2 (shown on the right in FIG. 2). The necessary process from the other side can be transferred accordingly.

Figure 4:
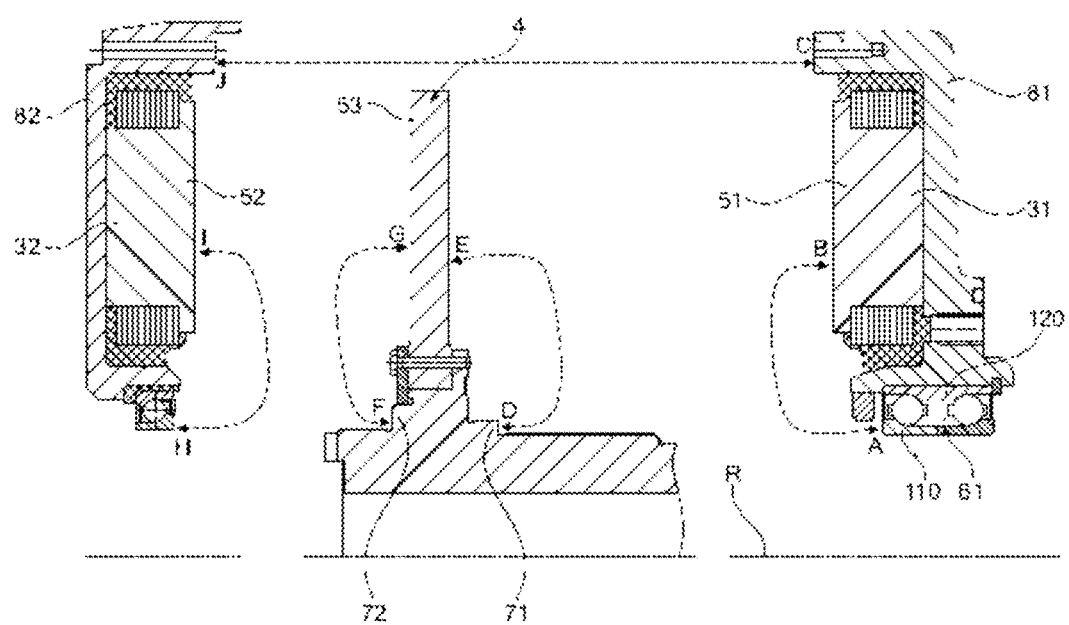
FIG. 4 shows a representation of the end faces to illustrate an assembly method.

The assembly process is illustrated in FIG. 4 in conjunction with FIG. 2:

First, the two right-hand assemblies, rotor 4 and first stator half 31, are oriented relative to one another. The rotor shaft W with a first shaft shoulder 71 is included here in the assembly of the rotor 4. The bearing point 61 is included in the assembly of the first stator half 31. On the output side of the first stator half 31, the axial dimension, i.e., the actual distance $AB_{act}$, between the end face A of the bearing inner ring 110 which is later connected to the rotor shaft W (surface A), and the stator surface B behind which the first stator magnets 51 are (region B) measured, are compared with a predetermined target distance $AB_{targ}$, and the deviation $\Delta AB$ is then determined. The actual distance $ED_{act}$ between the shaft shoulder 71 (surface D) of the rotor shaft W, on which the bearing forces are later supported axially, and the rotor surface E (surface E), behind which the rotor magnets 53 are located, is measured. The rotor surface E is here on the right side of the rotor 4, which faces the first stator half 31. The actual distance $ED_{act}$ is compared with a target distance $ED_{targ}$ and the deviation LED is determined. The deviations $\Delta AB$, $\Delta ED$ of the two actual distances $Ab_{act}$, $ED_{act}$ from the respective target distances $AB_{targ}$, $ED_{targ}$ can then be used to calculate the required width or thickness of the adjustment disc 200 between the end face A of the bearing inner ring 110 and the shaft shoulder D of the rotor shaft W that must be placed to compensate for the respective deviations $\Delta AB$, $\Delta ED$ (see FIG. 2). To this end, the deviations $\Delta AB$, $\Delta ED$ can be added, for example, and added to the normal thickness of an adjustment disc 200. The adjustment disc 200 with a normal thickness is provided precisely for the case in which the deviations $\Delta AB$, $\Delta ED$ add up to exactly zero. Attention must be paid here to the signs of the deviations $\Delta AB$, $\Delta ED$. Depending on how the deviations $\Delta AB$, $\Delta ED$ turn out on the rotor 4 and on the stator half 31, an adjustment disc is selected that is thicker or thinner than the normal thickness [adjustment disc thickness=normal thickness+$(AB_{act}-AB_{targ})$+$(ED_{targ}-ED_{act})$]. The selected adjustment disc 200 is then placed in front of the shaft shoulder D or end face A of the bearing ring 110 so that it lies between the shaft shoulder D and end face A. The rotor shaft W of this exemplary embodiment is then inserted into the bearing point 61 of the output-side first stator half 31 and screwed into the bearing point 61 by a shaft nut 24.

Instead of providing the adjustment disc 200 between the inner bearing ring 110 and the shoulder 71, a correspondingly dimensioned adjustment disc can also be provided between the end face of the outer bearing ring 120 and a shoulder of the first stator ring 81. The assignment of the adjustment disc 200 for positioning the stator ring 81 axially towards or away from the rotor 4 must be taken into account when determining the necessary thickness of the adjustment disc 200, which here leads to a sign change in the correction factor to be applied to the normal thickness. In this case, a change in the thickness of the adjustment disc 200, which is arranged on the outer bearing ring 120 between the outer bearing ring 120 and the stator ring 81, leads to an axial displacement between the stator ring 81 and the rotor 4 of the same amount but with a different sign than a change in the thickness of an adjustment disc 200 on the same axial side of the bearing in front of the bearing inner ring 110. In other words, if it has been determined using the method described above that an adjustment disc 200 which is thinner than the normal thickness by the dimension $\Delta X$ is required on the bearing inner ring 110, then if the same correction is made by an adjustment disc 200 on the same axial side of the bearing on the bearing outer ring 120, an adjustment disc 200 is to be used there which is thicker by the dimension $\Delta X$ than the normal thickness of this adjustment disc 200. Instead of an adjustment disc 200, a sleeve 30 can also be provided on the bearing inner ring 110 or bearing outer ring 120. The adjustment disc 200 would then be replaced by a radial region 203 of the sleeve 30 of equal axial thickness. If the bearing inner ring or bearing outer ring is axially fixed on both sides, the thickness of the adjustment disc (or other type of adjustment element) installed on the end face of the bearing ring also affects the axial location of the bearing on the opposite side of the bearing ring. The bearing should therefore be axially fixed on the side facing away from the adjustment element, for example by an element that can adapt to the actual bearing of the bearing ring end face. Alternatively, the bearing ring can also be arranged axially between two adjustment elements, so that it is possible to axially displace the bearing ring by varying the thickness of the adjustment elements while keeping the total axial thickness of the bearing ring and the two adjacent adjustment elements constant (such that when the amount with the one element becomes thinner, the other element becomes thicker). As a result, the bearing ring can also be fixed axially by components that cannot be easily adapted to the actual position of the bearing ring, such as shaft securing rings, grooves, component shoulders or contours of neighboring components.

Thereafter, the thickness for an adjustment disc 201 (see FIG. 2) provided between the second stator half 32 and the rotor 4 is calculated in the same manner. First, on the second stator half 32 facing away from the output, the distance $IH_{act}$ is measured between the end face H of the bearing inner ring 110 of the bearing point 62 (surface H) and the stator surface I, behind which the stator magnets 52 are located (surface I), this is compared with the nominal dimension $IH_{targ}$ and the deviation $\Delta IH$ is determined. The end face I faces the rotor 4 in this case. Then, in the same way, the distance $GF_{act}$ between the second shoulder 72, the shaft shoulder F (surface F), on which the bearing forces are later supported axially, and the rotor surface G (surface G), behind which the rotor magnets 53 are located, is measured, compared with the target dimension $GF_{targ}$ thereof, and the deviation $\Delta IGF$ is determined. On this side of the axial flux machine 2 as well, the necessary thickness for the adjustment disc 201 is determined as described above by the deviations $\Delta GF$, $\Delta IH$ of the two actual distances $GF_{act}$, $IH_{act}$ from the respective target distances $GF_{targ}$, $IH_{targ}$. The correct adjustment disc 201 can then be slid onto the rotor shaft W.

Here, too, the adjustment disc can alternatively be provided between a projection of the second stator ring 82 and the outer bearing ring 120 or, alternatively can also be replaced by the radial region 203 of a sleeve 30 (FIG. 2).

Before the second stator half 32 is finally assembled, the necessary thickness of an adjustment disc 202 between the stator halves 31, 32 is determined. The adjustment disc 202 is provided between axial end faces J and C which form the contact point of the axially extending, radially outer sections of the first and second stator rings 81 and 82.

There are three possibilities for doing this. The first option is to slide the second stator half 32 onto the rotor shaft W, which is already fitted with the correct adjustment discs 200, 201, and measure the distance $JC_{is}$ between the two surfaces J and C, then remove the second stator half 32 again and insert an adjustment disc 202, the thickness of which corresponds to the actual measured distance $JC_{act}$, to be positioned between the surfaces J and C when reassembling the stator half.

The second, preferred option is to measure the actual distances $AC_{act}$, $DF_{act}$, $HJ_{act}$ of the end faces A, C, D, F, H, J described above, the previously specified thicknesses of the two adjustment discs 201, 202 on the right and left of the rotor 4 must be taken into account and the correct thickness for the adjustment disc 202 to be determined therefrom, which must be installed between the two stator halves 31, 32 (surfaces J and C). When the adjustment disc 202 has been selected and inserted, the two stator halves 31, 32 of the exemplary embodiment can be screwed together.

Figure 5:
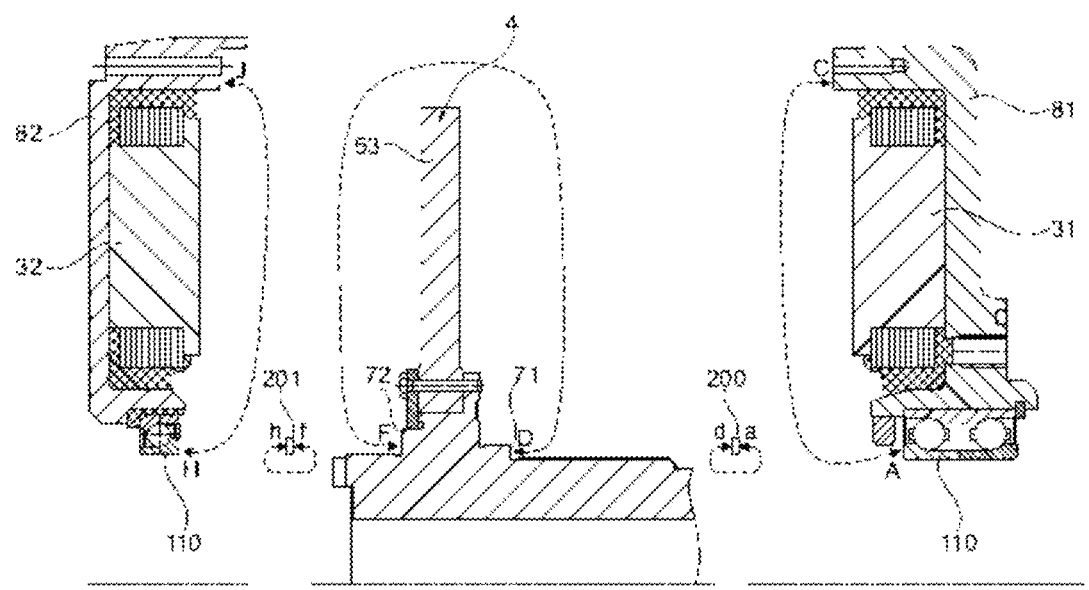
FIG. 5 shows a representation of the end faces to illustrate a further assembly method.

A third possibility is shown in FIG. 5. Here, first of all, adjustment discs 200, 201, as determined above, are used without assembling the assemblies.

Analogously to the determination of the deviations between the stator halves 31, 32 and the rotor 4, the actual axial distances $AC_{act}$, $DF_{act}$, $HJ_{act}$, $ad_{act}$, $fh_{act}$ of one assembly are then measured here again. In particular, the actual distances $ad_{act}$, $fh_{act}$ provide information about the actual thicknesses of the adjustment discs 200, 201. The surfaces a, d denote the end surfaces of the output-side adjustment disc 200 and face the surfaces A (of the inner ring 110) and D (of the first shoulder 71). Correspondingly, the surfaces f and h of the other adjustment disc 201 face the surfaces F, the second shoulder 72 and H of the other inner ring 110.

These actual distances $AC_{act}$, $DF_{act}$, $HJ_{act}$, $ad_{act}$, $fh_{act}$ are compared with corresponding target distances ($AC_{targ}$, $DF_{targ}$, $HJ_{targ}$, $ad_{targ}$, $fh_{targ}$) so that signed deviations ($\Delta AC$, $\Delta DF$, $\Delta HJ$, $\Delta ad$, $\Delta fh$) can be determined.

Figure 3:
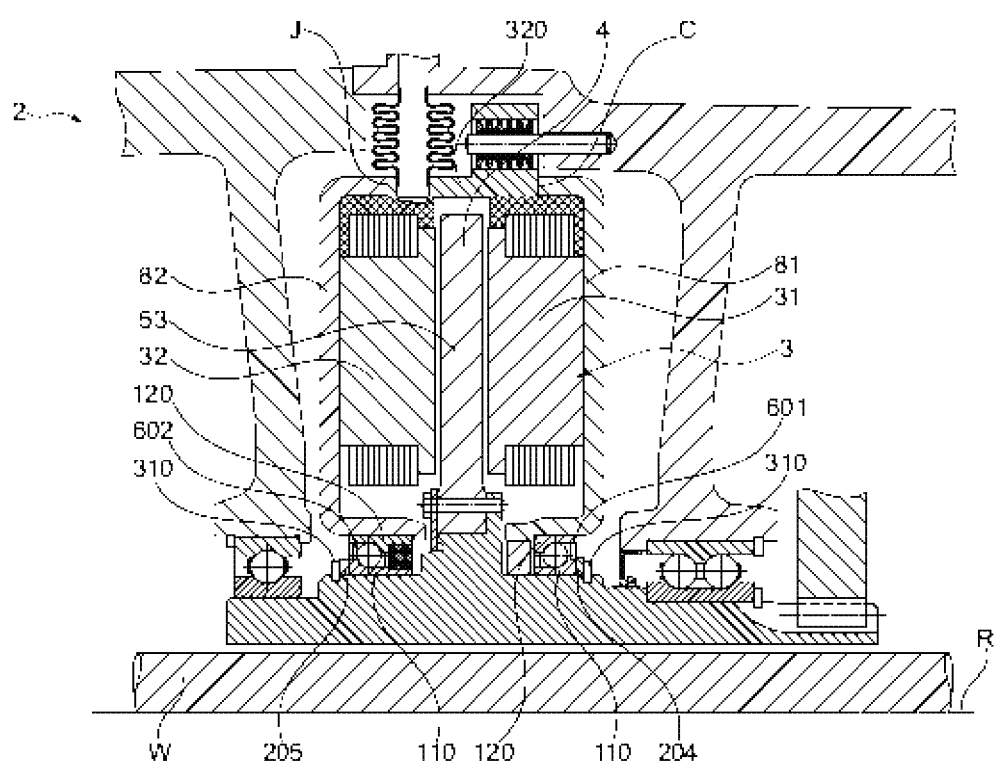
FIG. 3 shows a second machine arrangement having spacer elements.

If at least two of these deviations ($\Delta AC$, $\Delta DF$, $\Delta HJ$, $\Delta ad$, $\Delta fh$) are known, a statement can be made about the required thickness or the deviation of the thickness from the normal thickness, when there are no net deviations, for the adjustment disc 202 or a stator connection ring 320 (see FIG. 3).

Ideally, all deviations ($\Delta AC$, $\Delta DF$, $\Delta HJ$, $\Delta ad$, $\Delta fh$) are determined. The difference $\Delta CJ$ of the adjustment disc 202 or the stator connection ring 320 from the normal thickness $CJ_{norm}$ is then determined, taking into account the sign, from:

$$\Delta CJ = \Delta AC + \Delta DF + \Delta HJ + \Delta ad + \Delta fh.$$

Finally, an adjustment disc 202 or a stator connection ring 320 with a thickness $CJ_{norm} + \Delta CJ$ is then selected and placed between the two stator halves 31, 32 so that the air gaps 41 between the stator halves 31, 32 and the rotor 4 are adjusted accordingly.

In the exemplary embodiment in FIG. 2, there is a sleeve 30 on the bearing outer ring 120 of the bearing point 62 shown on the left, on which the bearing point 62 is supported axially. This sleeve 30 has a radial region 203. Sleeves 30 with radial regions 203 of different axial thickness can be provided, which can then be used as an alternative to adjustment discs 201, 202 of the same thickness. Between the sleeve 30 and the rotor position sensor 12 there is a further adjustment disc with which the exact axial distance of the rotor position sensor 12 to the end face of the rotor shaft W provided with recesses (measurement reference) can be adjusted.

Instead of circumferential ring-shaped adjustment discs 200, 201, 202, 204, 205 or sleeves 30, several adjustment elements 202a-202e distributed over the circumference can also be used, the thickness of which can be varied depending on the tolerance situation of the neighboring parts. A corresponding representation is shown by way of example in FIG. 6. Adjustment elements 202a-202e are shown here, which are arranged in the circumferential direction between two stator halves 31, 32 and here increase in thickness in a clockwise direction.

Figure 6:
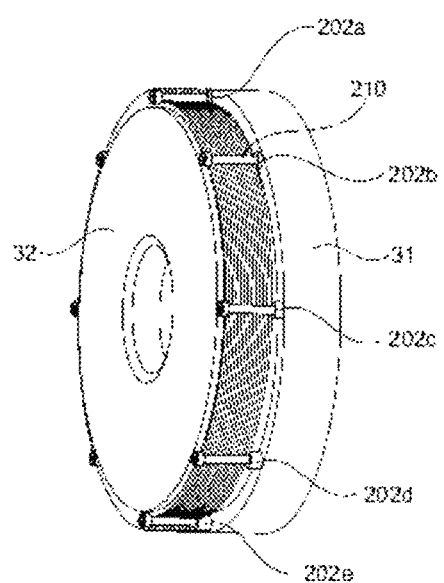
FIG. 6 shows a representation of spacer elements the thickness of which varies in the circumferential direction.

FIG. 6 shows an isometric representation of the stator 3, which has a tolerance-related inclined position of one of the two stator halves 31, 32. The two stator halves 31, 32 have holes distributed evenly around the circumference thereof, are oriented relative to one another here by means of eight adjustment elements 202a-202e distributed between the holes, have various thicknesses, and are connected to one another by means of screws 210. So that the screws 210 and the adjustment elements 202a-202e can be more recognizable in FIG. 6, the stator housing 32 shown in the figure on the left is not fully illustrated over half of the circumference, that is, the stator housing 32 is provided over about 180° of the circumference with a breakout (region of parallel hatch lines), whereby the screws 210 and the adjustment elements 202a-202e are exposed in this region. The adjustment elements 202a-202e are designed here as circular rings or annular discs arranged around the screws 210. To be able to orient the flat bolting surfaces of the two stator halves 31, 32 at an angle to one another, the adjustment elements 202a-202e with various thicknesses are arranged over the circumference of the stator 3 in such a way that the thicknesses of the adjustment elements 202a-202e can be measured from one point (in the figure above) to which the adjustment element 202a with the smallest thickness is attached, gradually increasing over the exposed circumference of the stator halves 31, 32 in this illustration, and from a point (in the figure below) where the adjustment element 202e with the greatest thickness is attached, where the thicknesses of the adjustment elements 202b-202d decrease again along the remaining circumference. In the case of these round adjustment elements 202a-202e or in the case of adjustment elements that are prevented from twisting by the contour thereof, one hole/drilling is sufficient to ensure simple installation.

In this way, tolerances in the circumferential direction could also be compensated. By using thicker adjustment elements on one side of the circumference than on the opposite side, the end faces of the adjacent assemblies which are intended to be relatively oriented by the adjustment elements are tilted relative to one another. As a result, the effect of geometry errors such as flatness errors, parallelism errors, axial run-out errors, angular errors and inclined positions on the electrical machine can be reduced. If the end faces are wavy or have partial flatness deviations, the thickness of the adjustment pieces distributed around the circumference can be adjusted so that each adjustment piece has the correct thickness for the individual installation position thereof. The thickness distribution of the adjustment pieces on the circumference does not necessarily follow a regular pattern or change continuously, and it can be based on the individual conditions of each individual electrical machine. Alternatively, it is also possible to use circumferential adjustment discs or adjustment rings, the thickness of which when seen on the handling is not consistent.

If not only two sloping surfaces are to be oriented in a defined angular position relative to one another and positioned axially, but additionally or alternatively if circumferential waviness or other form errors of a fastening surface that deviates from a flat surface are to be compensated for, the adjustment disc thicknesses need not have a regular course on the circumference, but can be determined and assigned individually for each position.

In general, it makes sense to measure the end faces, the axial positions of which must be measured in relation to one another, not just at one point, but at several points to be able to detect form deviations such as flatness errors, waviness, and skewing. The more precisely the end faces are measured and the more precisely the individual shape thereof can be evaluated, the more precisely and reliably the thickness of the subsequently installed adjustment elements can be selected. For complex adjustment processes with various adjustment thicknesses on the circumference, metrological recording of the end faces at many points distributed on the circumference is almost unavoidable.

During the measurement process, it can be useful to apply an axial preload to the components or assemblies. This axial force can be used, for example, to overcome bearing clearances or to press out initial waviness (or other for deviations) from the contact surfaces to obtain more accurate, more significant, and/or more reproducible measurement results. It is also possible to use forces that are exerted on the components or assemblies during the measurement process to simulate or at least partially approximate the loads thereon during operation of the electrical machine, so as to be able to metrologically record the shape that results during operation due to the elasticity of the components. For example, these forces can also be caused during the measurement by the magnets (permanent magnets or electromagnets) of the electrical machine, or can act mechanically or magnetically on the parts to be measured from the outside during the measurement process.

The measurement and calculation processes described above, with which the axial dimensions of the subassemblies are recorded and the required adjustment disc thickness is calculated, can all be used to compensate for angular errors and/or waviness in addition to the axial tolerances. Instead of measuring only one axial distance for each step of the subassemblies 4, 31, 32, which are relevant for the calculation of the correct adjustment element thickness, or using an averaged axial value from several axial measurements distributed on the handling to derive a relevant axial distance of the two end faces in relation to one another, the shape of the end faces or fastening surfaces must be determined at many points and the orientation of these surfaces to one another must be recorded. If the shape and bearing 61, 62, 601, 602 of the significant surfaces of each subassembly 4, 31, 32 of the axial flow machine 2 are known, it can also be used for each circumferential position at which an adjustment element between two subassemblies 4, 31, 32 is to be used to calculate correct axial adjustment element thickness for this position.

Figure 7:
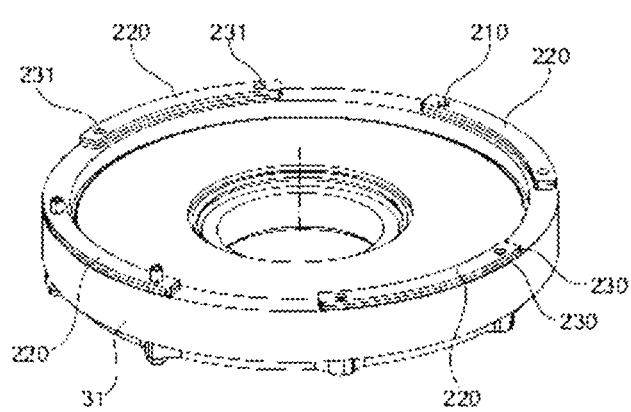
FIG. 7 shows a representation of spacer elements the thickness of which varies in the circumferential direction.

FIG. 7 shows a simplified 3D image of a stator half 31, on the contact surface of which are arranged four adjustment element stacks 220, each with two adjustment elements 230. To facilitate assembly and to prevent the adjustment elements 230 from slipping unintentionally, the elongated adjustment elements 230 have two holes 231 with which they can be pushed onto the screws 210 for fastening the stator half 31 or other extensions. In the case of round adjustment elements, as shown in FIG. 6, for example, or in the case of adjustment elements that are prevented from twisting by the contour thereof, one opening is sufficient to ensure easy assembly.

If a plurality of adjustment elements 230 or stacks of adjustment elements 220 are arranged on the circumference of the axial flow machine 2, this also makes it relatively easy to adjust a specially coordinated correction measure for each circumferential position. As a result, not only can the axial positions be adjusted between the subassemblies 4, 31, 32 by the assemblies 4, 31, 32 being moved in parallel to one another or away from one another by the correct selection of an adjustment disc thickness which is consistent on the circumference, but also tolerance-related inclinations and/or peripheral waviness of the connecting surfaces are compensated by the adjustment elements distributed on the circumference between the subassemblies 4, 31, 32 having different thicknesses.

FIG. 3 shows a further exemplary embodiment of the disclosure, in which adjustment discs 204, 205 are each arranged on the side of bearing points 601, 602 facing away from rotor 4. The adjustment discs 204, 205 are located between the bearing inner rings 110 and the shaft securing rings 310. In this exemplary embodiment, the length compensation between the two stator halves 31, 32 is effected by stator connecting rings 320 of different widths between end faces C and J, which also assume the task of supporting the stator 3 and carrying supply elements.

The terms "radial", "axial", "tangential", and "circumferential direction" used in this disclosure disclosure always refer to the axis of rotation R of the axial flux machine 2.

LIST OF REFERENCE SYMBOLS

1 Electrical machine arrangement
2 Axial flux machine
3 Stator
31 Abutment
4 Rotor
41 Abutment
6 Supporting component (for the stator)
7 Housing
11 Shaft grounding ring
12 Rotor position sensor
22 Transmission stage
24 Shaft nut
30 Sleeve
31 First stator half
32 Second stator half
41 Air gap
51 First stator magnets
52 Second stator magnets
53 Rotor magnets
61 Bearing point (between rotor and stator)
611 First bearing point
612 Second bearing point
62 Bearing point (between the rotor and housing)
621 First bearing point
622 Second bearing point 71 First shoulder
72 Second shoulder
80 Stator ring
81 First stator ring
82 Second stator ring
100 Output element
110 Bearing inner ring
120 Bearing outer ring
200 First adjustment disc
201 Second adjustment disc
202 Third adjustment disc
202a-202e Adjustment disc
203 Radial region
204,205 Adjustment disc
210 Screw
220 Adjustment element stack
230 Adjustment element
231 Hole
310 Shaft securing ring
320 Stator connection ring
X Axial extension (of the stator)
W Rotor shaft
R Axis of rotation

The invention claimed is:

1. An electrical machine arrangement for driving an electrically drivable motor vehicle, comprising:
an electrical axial flow machine having a stator and a rotor, wherein the rotor is supported for rotation inside the electrical machine arrangement by at least one bearing point, the stator has at least a first stator half and a second stator half, axially spaced apart from the rotor on respective different axial sides by an air gap, and at least one spacer element axially orientating at least two assemblies relative to one another, the assemblies including: the first stator half, the second stator half, and the rotor, wherein the first stator half is coupled to a rotor shaft by a first bearing point, and the second stator half is coupled to the rotor shaft by a second bearing point, the rotor is in non-rotatable contact with the rotor shaft, and the axial orientation of at least one of the first stator half or the second stator half to the rotor is fixed by the at least one spacer element, and the first bearing point and the second bearing point support the rotor both axially and radially via the rotor shaft on the first stator half and the second stator half.

2. The electrical machine arrangement according to claim 1, wherein at least one of the first stator half or second stator half is coupled to a rotor shaft by at least one bearing point, the rotor is in non-rotatable contact with the rotor shaft, and the axial orientation of at least one of the first stator half or second stator half is fixed to the rotor by the at least one spacer element.

3. The electrical machine arrangement according to claim 2, wherein the spacer element is arranged axially between the at least one bearing point and the rotor, or axially between the at least one bearing point and one of the two stator halves.

4. The electrical machine arrangement according to claim 3, wherein the spacer element comprises an adjustment disc arranged on an axial end face of a bearing inner ring or a bearing outer ring of the at least one bearing point.

5. The electrical machine arrangement according to claim 3, wherein the spacer element comprises a radial region of a sleeve.

6. The electrical machine arrangement according to claim 1, wherein the first stator half is oriented axially relative to the second stator half by a spacer element, wherein the spacer element is axially arranged between the two stator halves and axially arranged on an end face of each stator half, and is arranged radially outside of the rotor.

* * * * *